(12) United States Patent
Yang et al.

(10) Patent No.: US 11,248,853 B2
(45) Date of Patent: Feb. 15, 2022

(54) PRINTED CIRCUIT-TYPE HEAT EXCHANGER AND GAS-LIQUID SEPARATING DEVICE HAVING GAS-LIQUID SEPARATING STRUCTURE

(71) Applicant: DOOSAN HEAVY INDUSTRIES & CONSTRUCTION CO., LTD., Changwon-si (KR)

(72) Inventors: Ki Hoon Yang, Yongin-si (KR); Jeong Kil Kim, Busan (KR); Chil Yeong Seon, Yongin-si (KR); In Chui Jung, Changwon-si (KR)

( * ) Notice: Subject to any disclaimer, the term of this patent is extended or adjusted under 35 U.S.C. 154(b) by 417 days.

(21) Appl. No.: 16/184,761

(22) Filed: Nov. 8, 2018

(65) Prior Publication Data

US 2019/0195573 A1 Jun. 27, 2019

(30) Foreign Application Priority Data

Dec. 21, 2017 (KR) .......................... 10-2017-0177082

(51) Int. Cl.
*F28F 3/08* (2006.01)
*B01D 19/00* (2006.01)
(Continued)

(52) U.S. Cl.
CPC ................ *F28F 3/08* (2013.01); *B01D 1/221* (2013.01); *B01D 19/0042* (2013.01);
(Continued)

(58) Field of Classification Search
CPC ........... F28F 3/08; F28F 3/086; F28D 9/0037; B01D 19/0042; B01D 1/221; B01D 45/02; B01D 45/08; F23K 5/002; F23K 2400/10
See application file for complete search history.

(56) References Cited

U.S. PATENT DOCUMENTS

2011/0120182 A1* 5/2011 Haussmann .......... F25B 39/022
62/524
2015/0004504 A1* 1/2015 Bardeleben ....... H01M 8/04164
429/413
(Continued)

FOREIGN PATENT DOCUMENTS

JP H08254398 A 10/1996
JP H09195941 A 7/1997
(Continued)

OTHER PUBLICATIONS

A Chinese Office Action dated Mar. 27, 2020 in connection with Chinese Patent Application No. 201811344463.4 which corresponds to the above-referenced U.S. application.
(Continued)

*Primary Examiner* — Frantz F Jules
*Assistant Examiner* — Webeshet Mengesha
(74) *Attorney, Agent, or Firm* — Harvest IP Law, LLP

(57) ABSTRACT

A printed circuit-type heat exchanger includes a vaporizer having a structure in which one or more A-channel plates and one or more B-channel plates are sequentially stacked, to vaporize a fluid A with heat exchange through the A-fluid channels. A gas-liquid separator separates the fluid A into a vaporized gas and a non-vaporized liquid and includes a gas outlet for the vaporized gas and a liquid outlet for non-vaporized liquid. A super heater, having the same structure as the vaporizer, super heats the vaporized gas with heat exchange through the A-fluid channels and discharges the superheated gas through a gas outlet communicating with the outside. A first intermediate plate is disposed between the vaporizer and the gas-liquid separator to separate the vaporizer from the gas-liquid separator, and a second intermediate plate is disposed between the gas-liquid separator and the
(Continued)

super heater to separate the super heater from the gas-liquid separator.

18 Claims, 6 Drawing Sheets

(51) Int. Cl.
| | |
|---|---|
| *F23K 5/00* | (2006.01) |
| *B01D 1/22* | (2006.01) |
| *F28D 9/00* | (2006.01) |
| *B01D 45/08* | (2006.01) |
| *B01D 45/02* | (2006.01) |

(52) U.S. Cl.
CPC ............ *F23K 5/002* (2013.01); *F28D 9/0037* (2013.01); *F28F 3/086* (2013.01); *B01D 45/02* (2013.01); *B01D 45/08* (2013.01); *F23K 2400/10* (2020.05)

(56) References Cited

U.S. PATENT DOCUMENTS

| | | | |
|---|---|---|---|
| 2016/0131434 A1* | 5/2016 | Noishiki | F28F 3/086 165/296 |
| 2017/0038151 A1* | 2/2017 | Noda | F25B 39/00 |

FOREIGN PATENT DOCUMENTS

| | | |
|---|---|---|
| JP | 2014521913 A | 8/2014 |
| JP | 2015-31420 A | 2/2015 |
| JP | 2015-210015 A | 11/2015 |
| KR | 20-0240531 Y1 | 9/2001 |
| KR | 20-2011-0000572 U | 1/2011 |
| KR | 20-0479402 Y1 | 1/2016 |
| KR | 101784908 B1 | 10/2017 |

OTHER PUBLICATIONS

A Korean Office Action dated Jan. 17, 2019 in connection with Korean Patent Application No. 10-2017-0177082 which corresponds to the above-referenced U.S. application.

* cited by examiner

PRINTED CIRCUIT-TYPE HEAT EXCHANGER AND GAS-LIQUID SEPARATING DEVICE HAVING GAS-LIQUID SEPARATING STRUCTURE

CROSS REFERENCE TO RELATED APPLICATIONS

The present application claims priority to Korean Patent Application No. 10-2017-0177082, filed on Dec. 21, 2017, the entire contents of which are incorporated herein for all purposes by this reference.

BACKGROUND OF THE INVENTION

1. Field of the Invention

The present invention relates to a printed circuit-type heat exchanger and a gas-liquid separating device. More particularly, the present invention relates to a printed circuit-type heat exchanger and gas-liquid separating device having a structure capable of performing gas-liquid separation.

2. Description of the Background Art

A conventional shell-tube type heat exchanger has a problem in that the heat exchanger is disadvantageous in terms of heat transfer area per unit volume. That is, a housing of such a heat exchanger should be of sufficient size to accommodate heat expansion if heat expansion occurs, thereby requiring bulky, heavy equipment for treating a certain level of heat exchange capacity.

Particularly, a heat exchanger for an LNG ship preferably has a small volume with a certain level of heat exchange capacity. Thus, it is very difficult for the conventional shell-tube type heat exchanger to be applied to an LNG ship or the like, because the heat exchanger is bulky and heavy.

The conventional shell-tube type heat exchanger also has problems in that the maintenance and repair is not easy and in that the heat exchanger's size and weight necessitate high-capacity handling equipment such as a crane for moving the heat exchanger.

The shell-tube type heat exchanger is also used to separate an injected fluid into liquid and gas with application of heat, as illustrated in FIG. 1.

In the case where the fluid is separated into liquid and gas by the conventional shell-tube type heat exchanger, the separation is easy since the volume of the heat exchanger itself is very large. However, the shell-tube type heat exchanger has a problem in that it is difficult for the heat exchanger to be used in a space restricted environment due to the large volume of the heat exchanger.

To solve these problems, as illustrated in FIG. 2, a printed circuit-type heat exchanger capable of being designed in a small volume may be used.

However, when the gas-liquid separation is obtained by using the printed circuit-type heat exchanger, it is required to separately fabricate a vaporizer, a super heater, and a gas-liquid separator, problematically causing tube connection to become very complicated.

Thus, it is required to provide a technique for a printed circuit-type heat exchanger to solve the above-mentioned problems with the related art.

SUMMARY OF THE INVENTION

Accordingly, it is an object of the present invention to provide a printed circuit-type heat exchanger capable of performing a gas-liquid function as well.

It is a further object of the present invention to provide a printed circuit-type heat exchanger and a gas-liquid separating device having a gas-liquid separating structure in which a vaporized gas of the fluid B transferred from the vaporizer is effectively separated and in which the vaporized gas is stably transferred to the super heater, and thus considerably improves the gas-liquid separating efficiency.

According to one aspect of the present invention, there is provided a printed circuit-type heat exchanger in which an A-fluid channel and a B-fluid channel are formed to exchange heat between a fluid A and a fluid B. The heat exchanger may include a vaporizer having a structure in which one or more A-channel plates and one or more B-channel plates are sequentially stacked, the A-channel plates of the vaporizer each having an A-fluid channel and the B-channel plates of the vaporizer each having an B-fluid channel intersecting with the A-fluid channel of the vaporizer, the vaporizer configured to vaporize the fluid A with heat exchange through the A-fluid channels and to pass the vaporized fluid A; a gas-liquid separator provided next to the vaporizer to separate the fluid A transferred from the vaporizer into a vaporized gas and a non-vaporized liquid, the gas-liquid separator including a gas outlet formed on one side through which the vaporized gas of the fluid A is passed and a liquid outlet formed on the other side through which the non-vaporized liquid of the fluid A is discharged; and a super heater provided next to the gas-liquid separator having a structure in which one or more A-channel plates and one or more B-channel plates are sequentially stacked, the A-channel plates of the super heater each having an A-fluid channel and the B-channel plates of the super heater each having a B-fluid channel intersecting with the A-fluid channel of the super heater, the super heater configured to super heat the vaporized gas transferred from the gas-liquid separator with heat exchange through the A-fluid channels, and including a gas outlet formed on one side through which the superheated gas is discharged.

The heat exchanger may further include one or both of a first intermediate plate disposed between the vaporizer and the gas-liquid separator to separate the vaporizer from the gas-liquid separator, the first intermediate plate including a fluid connection path so that an A-fluid outlet of the vaporizer communicates with the gas-liquid separator; and a second intermediate plate disposed between the gas-liquid separator and the super heater to separate the super heater from the gas-liquid separator, the second intermediate plate including a fluid connection path so that an inlet of the super heater for the vaporized fluid A communicates with the gas-liquid separator.

The gas-liquid separator may have a sufficient width to separate the vaporizer and the super heater by a predetermined distance, and may include an internal space to perform a gas-liquid separating function. Here, the heat exchanger may further include a baffle configured to separate a gas and which may be disposed on an upper end of the internal space of the gas-liquid separator and is preferably disposed adjacent to the gas outlet of the gas-liquid separator.

The vaporizer may be detachably attached to one side of the gas-liquid separator, and the super heater may be detachably attached to the other side of the gas-liquid separator.

The A-fluid channel of each A-channel plate may include a series of bends in alternating directions. The bends may form a continuous path following a zigzag pattern, and the channel may have a horizontally symmetrical structure in which sides of consecutive bends contact each other.

According to another aspect of the present invention, there is provided a gas-liquid separating device including the above vaporizer, the above gas-liquid separator, and the above super heater.

The effects, features, and advantages of the invention are not limited to the above effects, features, and advantages, and other effects, features, and advantages of the invention will be understood from a detailed description of the invention or the configurations recited in the accompanying claims.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings. It should be noted that terms used in this specification and claims should not be limited to a common meaning or a dictionary definition, but should be construed as the meanings and concepts according to technical spirits of the present invention.

It will be understood that when an element is referred to as being "on" another element, it can be directly on the other element or intervening elements may be present therebetween. Further, it will be understood that the term "comprising" or "including" specifies the presence of stated elements, but does not preclude the presence or addition of one or more other elements, unless the context clearly indicates otherwise.

Figure 1:
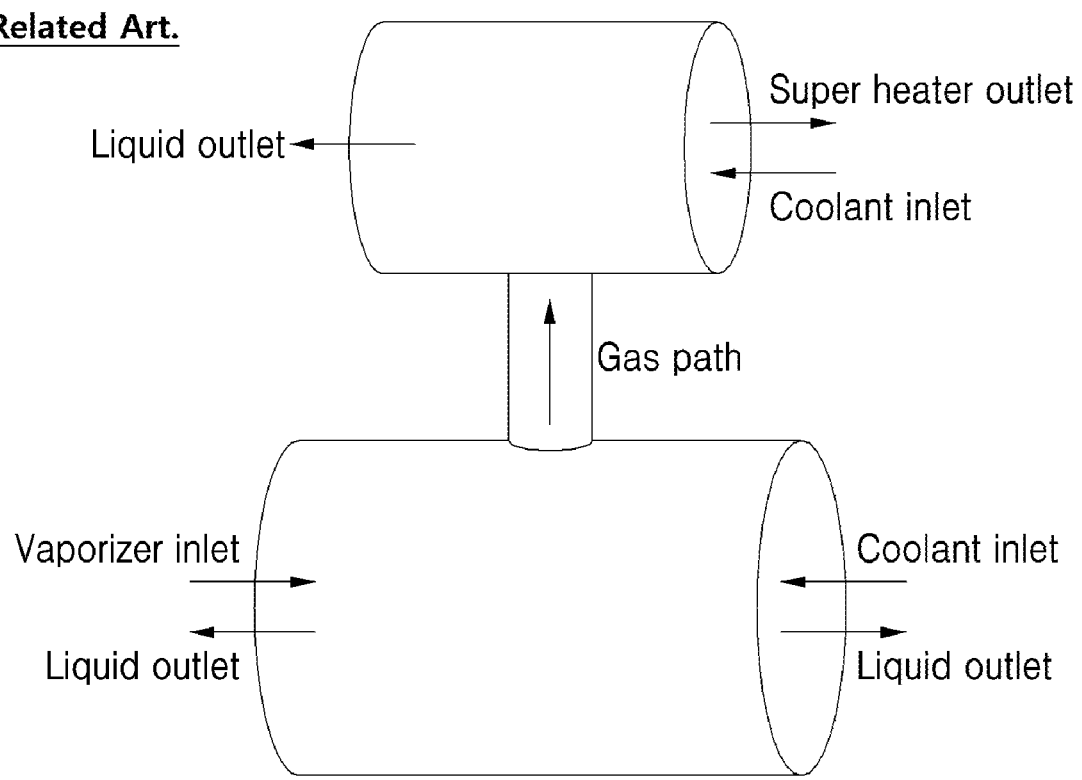
FIG. 1 is a schematic diagram of a conventional shell-tube type heat exchanger performing gas-liquid separation.
Figure 2:
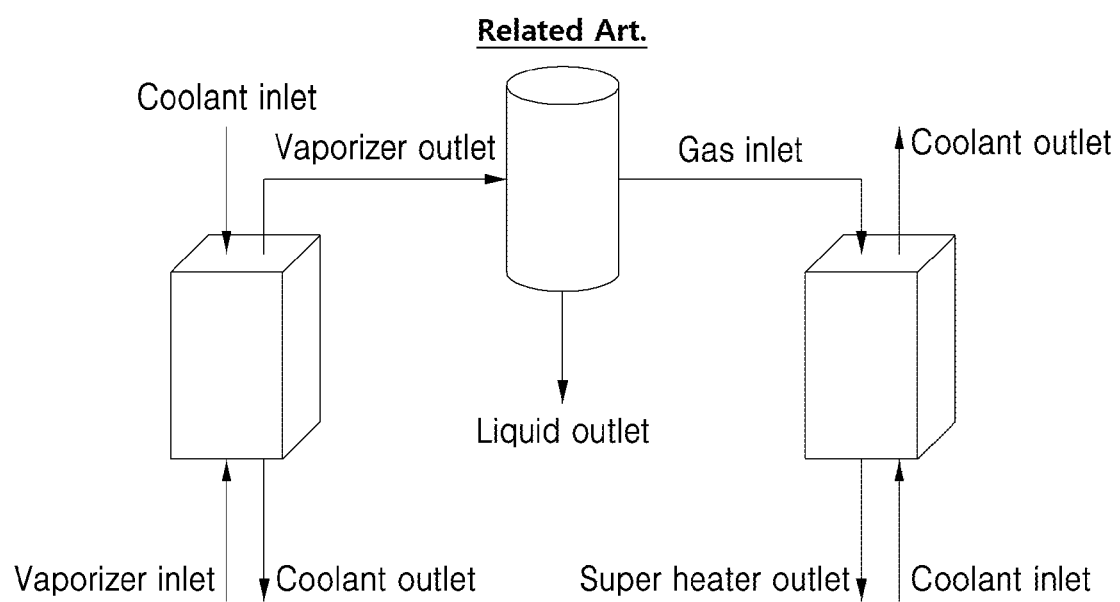
FIG. 2 is a schematic diagram of a conventional printed circuit-type heat exchanger performing gas-liquid separation.
Figure 3:
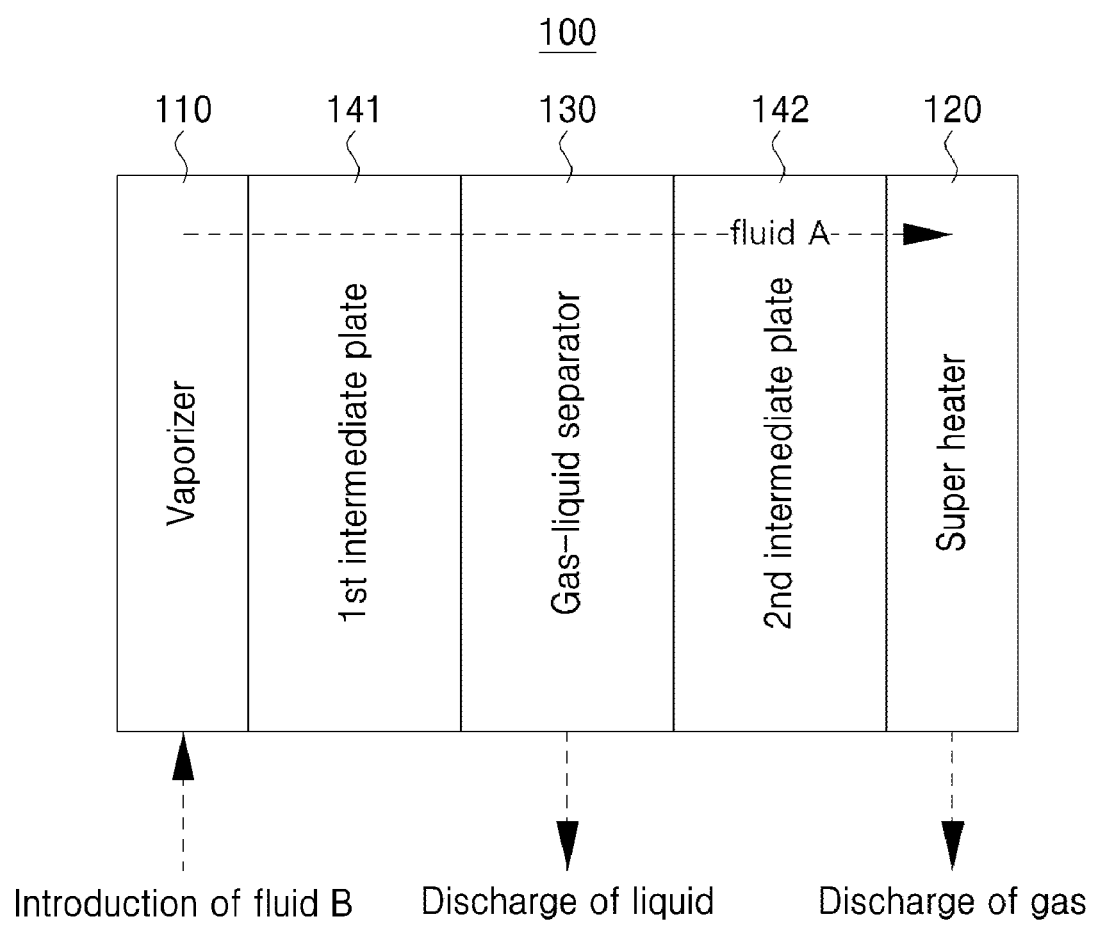
FIG. 3 is a diagrammatic view of a printed circuit-type heat exchanger according to an embodiment of the present invention.
Figure 4:
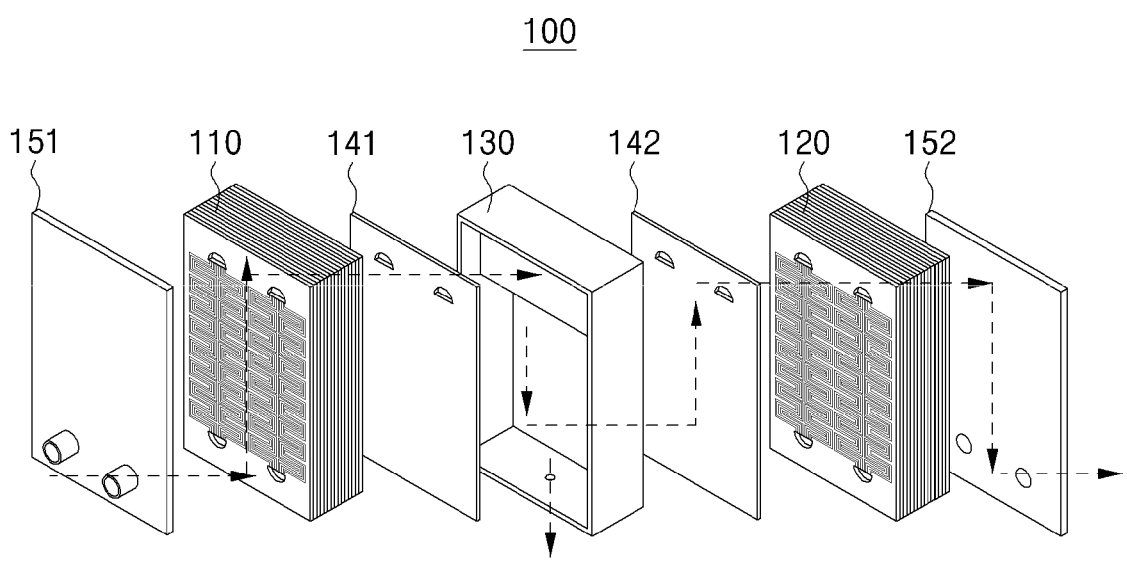
FIG. 4 is an exploded perspective view of the printed circuit-type heat exchanger according to the embodiment of the present invention.
Figure 5:
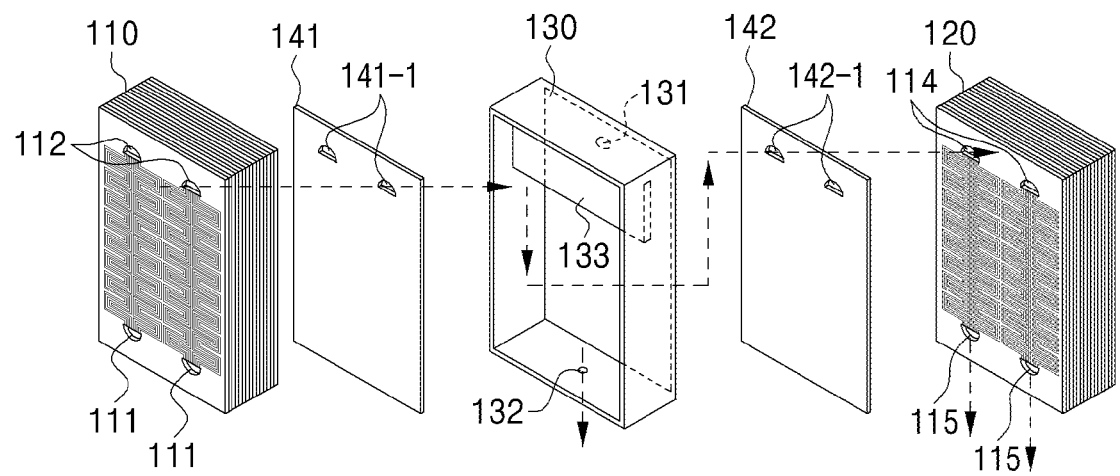
FIG. 5 is a perspective view of a portion of FIG. 4, showing the vaporizer, the gas-liquid separator, and the super heater.

Referring to FIGS. 3-5, a printed circuit-type heat exchanger 100 has a structure in which a channel for fluid A and a channel for fluid B are formed so as to perform a heat exchange between fluid A and fluid B. The printed circuit-type heat exchanger 100 includes a vaporizer 110, a gas-liquid separator 130, and a supper heater 120 so as to perform a gas-liquid separation function in addition to the heat exchange. While these drawings focus on the printed circuit-type heat exchanger, the present invention may further provide a gas-liquid separating device including the vaporizer 110, the gas-liquid separator 130, and the super heater 120.

Figure 6:
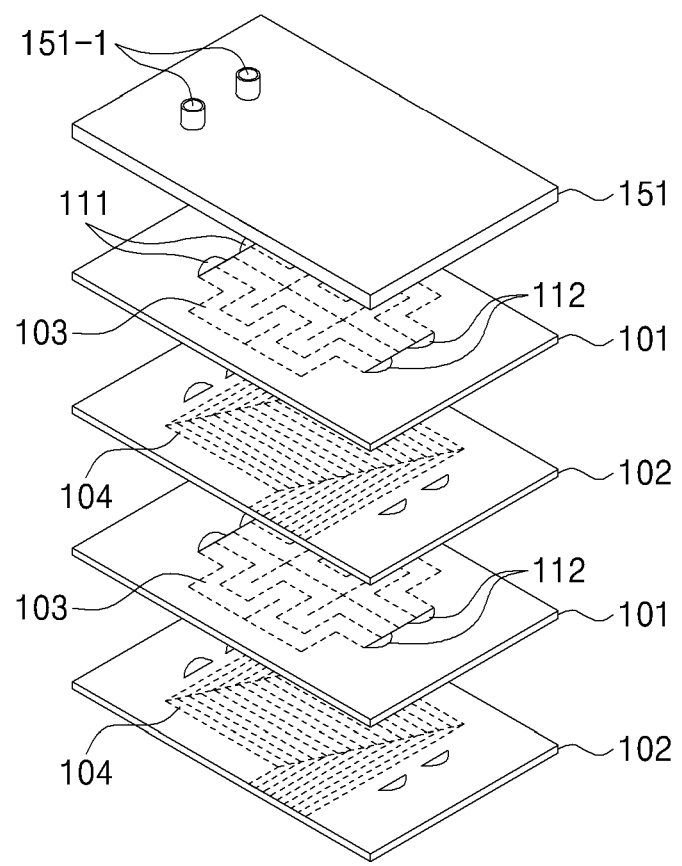
FIG. 6 is an exploded perspective view of the vaporizer shown in FIGS. 4 and 5.

Hereinafter, the vaporizer 110, the gas-liquid separator 130, and the super heater 120 constituting both the printed circuit-type heat exchanger and the gas-liquid separating device will be described in detail with reference to the accompanying drawings, in which FIG. 6 illustrates the vaporizer 110 shown in FIGS. 4 and 5.

The printed circuit-type heat exchanger 100 has a compact structure in which the vaporizer 110, the gas-liquid separator 130, and the super heater 120 are integrally formed so that the structure can be properly applied to a narrow space environment.

Referring to FIG. 6, the vaporizer 110 has a structure in which one or more A-channel plates 101 and one or more B-channel plates 102 are sequentially stacked so as to perform their respective functions using a heat exchange of introduced fluid. Although not specifically shown, the super heater 120 has a corresponding structure in which one or more A-channel plates 101 and one or more B-channel plates 102 are sequentially stacked so as to perform their respective functions using a heat exchange of introduced fluid.

Further, as illustrated in FIG. 4, first and second cover sections 151 and 152 may be respectively attached to both sides of a coupled unit of the vaporizer 110, the gas-liquid separator 130, and the super heater 120. Here, the first cover section 151 is a planar structure which closes one side of the vaporizer 110 and has an A-fluid inlet 151-1 through which a fluid A is introduced into an A-fluid channel 103 of the vaporizer 110. Further, the second cover section 152 is a planar structure which closes one side of the super heater 120 and has an outlet 152-1 through which a gas superheated from the super heater 120 is discharged to the outside.

The A-fluid channel 103 formed in the A-channel plate 101 has a horizontally symmetrical structure in a plan view (i.e., a vertical line of symmetry), which structure preferably has a sufficiently wide contact area to maximize heat exchange efficiency. Specifically, with respect to a plan view of the A-fluid channel 103, the channel has a structure having a series of bends in alternating (e.g., opposite) directions which form a continuous path following a zigzag pattern. Here, the channel has the horizontally symmetrical structure in which sides of consecutive bends contact each other, thereby maximizing a contact area with a fluid and improving heat exchange efficiency.

The vaporizer 110 has a structure which vaporizes a fluid A passed through the A-fluid channel 103 with heat exchange and moves the vaporized fluid to the gas-liquid separator 130. That is, the vaporized gas of the fluid A is passed to a next stage unit. The super heater 120 has the same structure as the vaporizer 110, although respective structures for introducing fluid and for discharging fluid may have different physical properties.

The gas-liquid separator 130 between the vaporizer 110 and the super heater 120 may transfer a vaporized gas of the fluid A transferred from the vaporizer 110 to the super heater 120, i.e., a next stage unit. At the same time, the gas-liquid separator 130 may discharge a non-vaporized liquid of the fluid A transferred from the vaporizer 110 to the outside.

Specifically, the gas-liquid separator 130 has a structure in which a gas outlet 131 formed on one side is provided to pass the vaporized gas of the fluid A from the vaporizer 110 to the super heater 120 and in which a liquid outlet 132 formed on the other side is provided to discharge the non-vaporized liquid of the fluid A from the vaporizer 110 to the outside.

The gas-liquid separator 130 has a sufficient width to separate the vaporizer 110 and the super heater 120 by a predetermined distance, and includes an internal space to perform a gas-liquid separating function. As shown in FIG. 5, a baffle 133 for separating a gas is provided on the upper end of an internal space of the gas-liquid separator 130, so as to considerably improve the gas-liquid separating efficiency. Here, the baffle 133 is preferably provided adjacent to the gas outlet 131.

If needed, a first intermediate plate 141 may be provided between the vaporizer 110 and the gas-liquid separator 130, as shown in FIGS. 4 and 5.

The first intermediate plate 141 may separate the vaporizer 110 from the gas-liquid separator 130. Further, in an embodiment, a fluid connection path 141-1 may be formed at one end of the first intermediate plate 141 so that the A-fluid outlet 112 communicates with the gas-liquid separator 130.

Further, a second intermediate plate 142 may be provided between the gas-liquid separator 130 and super heater 120. Here, the second intermediate plate 142 may separate the super heater 120 from the gas-liquid separator 130, and a fluid connection path 142-1 may be formed at one end of the second intermediate plate 142 so that an inlet 114 for vaporized fluid A communicates with the gas-liquid separator 130.

In the meantime, as shown in FIG. 5, the vaporizer 110 and the super heater 120 may be detachably attached to both sides of the gas-liquid separator 130, respectively. In this case, if the vaporizer 110 or the super heater 120 requires maintenance, the vaporizer or the super heater can be easily removed from the gas-liquid separator 130, providing easy access.

As set forth in the foregoing description, the present invention provides the printed circuit-type heat exchanger including a characterized structure having the vaporizer, the gas-liquid separator, and the super heater, capable of performing a gas-liquid separating function as well.

Further, according to the present invention, a characterized structure of the first and second intermediate plates and the gas-liquid separator is provided, thereby effectively separating a vaporized gas of the fluid B transferred from the vaporizer and stably transferring the vaporized gas to the super heater, and thus considerably improving the gas-liquid separating efficiency.

Furthermore, according to the present invention, a characterized structure of the gas-liquid separator has the baffle and the gas outlet, thereby effectively separating a vaporized gas of the fluid B transferred from the vaporizer and stably transferring the vaporized gas to the super heater, and thus considerably improves the gas-liquid separating efficiency.

While the exemplary embodiments of the present invention have been described in the detailed description, the present invention is not limited thereto, but should be construed as including all of modifications, equivalents, and substitutions falling within the spirit and scope of the invention defined by the appended claims.

That is, the present invention is not limited to the above-mentioned embodiments and the description thereof, and it will be appreciated by those skilled in the art that various modifications and equivalent embodiments are possible without departing from the scope and spirit of the invention defined by the appended claims and that the present invention covers all the modifications and equivalents falling within the spirit and the scope of the present invention as defined by the appended claims.

What is claimed is:

1. A printed circuit-type heat exchanger in which an A-fluid channel and a B-fluid channel are formed to exchange heat between a fluid A and a fluid B, the heat exchanger comprising:

a vaporizer having a structure in which one or more A-channel plates and one or more B-channel plates are sequentially stacked, the A-channel plates of the vaporizer each having an A-fluid channel and the B-channel plates of the vaporizer each having an B-fluid channel intersecting with the A-fluid channel of the vaporizer, the vaporizer configured to vaporize the fluid A with heat exchange through the A-fluid channels and to pass the vaporized fluid A through an A-fluid outlet;

a gas-liquid separator provided next to the vaporizer to separate the fluid A transferred from the vaporizer into a vaporized gas and a non-vaporized liquid, the gas-liquid separator including:

an upper side, a lower side disposed opposite to the upper side, lateral sides respectively connecting opposite ends of the upper side to opposite ends of the lower side, a gas outlet formed through the upper side and configured to pass the vaporized gas of the fluid A outside the gas-liquid separator in a first direction, a liquid outlet formed through the lower side and configured to discharge the non-vaporized liquid of the fluid A outside the gas-liquid separator in a direction opposite to the first direction, an internal space to perform a gas-liquid separating function, the internal space extending in the first direction from the upper side to the lower side and extending between the lateral sides in a second direction perpendicular to the first direction, and a baffle for separating a gas in the fluid A transferred from the vaporizer, the baffle disposed inside the internal space on the upper side of the gas-liquid separator, the baffle being disposed adjacent to the gas outlet formed on the upper side of the gas-liquid separator and opposite to the liquid outlet formed on the lower side of the gas-liquid separator to improve the gas-liquid separating function; and a super heater provided next to the gas-liquid separator having a structure in which one or more A-channel plates and one or more B-channel plates are sequentially stacked, the A-channel plates of the super heater each having an A-fluid channel and the B-channel plates of the super heater each having a B-fluid channel intersecting with the A-fluid channel of the super heater, the super heater configured to super heat the vaporized gas transferred from the gas-liquid separator with heat exchange through the A-fluid channels, and including a gas outlet formed on one side through which the superheated gas is discharged, wherein the baffle includes a continuous surface facing toward the A-fluid outlet of the vaporizer, the continuous surface extending from the upper side of the gas-liquid separator toward the lower side of the gas-liquid separator and extending between the lateral sides of the gas-liquid separator.

2. The printed circuit-type heat exchanger of claim 1, further comprising:

a first intermediate plate disposed between the vaporizer and the gas-liquid separator to separate the vaporizer from the gas-liquid separator, the first intermediate plate including a fluid connection path so that the A-fluid outlet of the vaporizer communicates with the gas-liquid separator.

3. The printed circuit-type heat exchanger of claim 1, further comprising:

a second intermediate plate disposed between the gas-liquid separator and the super heater to separate the super heater from the gas-liquid separator, the second intermediate plate including a fluid connection path so that an inlet of the super heater for the vaporized fluid A communicates with the gas-liquid separator.

4. The printed circuit-type heat exchanger of claim 1, wherein the gas-liquid separator has a sufficient width to separate the vaporizer and the super heater by a predetermined distance in a third direction perpendicular to both the first and second directions.

5. The printed circuit-type heat exchanger of claim 1, wherein the baffle is disposed adjacent to the gas outlet of the gas-liquid separator.

6. The printed circuit-type heat exchanger of claim 1, wherein the vaporizer is detachably attached to one side of the gas-liquid separator.

7. The printed circuit-type heat exchanger of claim 1, wherein the super heater is detachably attached to one side of the gas-liquid separator.

8. The printed circuit-type heat exchanger of claim 1, wherein the A-fluid channel of each A-channel plate includes a series of bends in alternating directions.

9. The printed circuit-type heat exchanger of claim 8, wherein the bends form a continuous path following a zigzag pattern.

10. The printed circuit-type heat exchanger of claim 8, wherein the channel has a horizontally symmetrical structure in which sides of consecutive bends contact each other.

11. A gas-liquid separating device comprising:
a vaporizer having a structure in which one or more A-channel plates and one or more B-channel plates are sequentially stacked, the A-channel plates of the vaporizer each having an A-fluid channel and the B-channel plates of the vaporizer each having a B-fluid channel intersecting with the A-fluid channel of the vaporizer, the vaporizer configured to vaporize the fluid A with heat exchange through the A-fluid channels and to pass the vaporized fluid A through an A-fluid outlet;
a gas-liquid separator provided next to the vaporizer to separate the fluid A transferred from the vaporizer into a vaporized gas and a non-vaporized liquid, the gas-liquid separator including:
an upper side,
a lower side disposed opposite to the upper side,
lateral sides respectively connecting opposite ends of the upper side to opposite ends of the lower side,
a gas outlet formed through the upper side and configured to pass the vaporized gas of the fluid A outside the gas-liquid separator in a first direction,
a liquid outlet formed through the lower side and configured to discharge the non-vaporized liquid of the fluid A outside the gas-liquid separator in a second direction opposite to the first direction,
an internal space to perform a gas-liquid separating function, the internal space extending in the first direction from the upper side to the lower side and extending between the lateral sides in a second direction perpendicular to the first direction, and
a baffle for separating a gas in the fluid A transferred from the vaporizer, the baffle disposed inside the internal space on the upper side of the gas-liquid separator, the baffle being disposed adjacent to the gas outlet formed on the upper side of the gas-liquid separator and opposite to the liquid outlet formed on the lower side of the gas-liquid separator to improve the gas-liquid separating function; and
a super heater provided next to the gas-liquid separator having a structure in which one or more A-channel plates and one or more B-channel plates are sequentially stacked, the A-channel plates of the super heater each having an A-fluid channel and the B-channel plates of the super heater each having a B-fluid channel intersecting with the A-fluid channel of the super heater, the super heater configured to super heat the vaporized gas transferred from the gas-liquid separator with heat exchange through the A-fluid channels, and including a gas outlet formed on one side through which the superheated gas is discharged,
wherein the baffle includes a continuous surface facing toward the fluid A outlet of the vaporizer, the continuous surface extending from the upper side of the gas-liquid separator toward the lower side of the gas-liquid separator and extending between the lateral sides of the gas-liquid separator.

12. The gas-liquid separating device of claim 11, further comprising:
a first intermediate plate disposed between the vaporizer and the gas-liquid separator to separate the vaporizer from the gas-liquid separator, the first intermediate plate including a fluid connection path so that the A-fluid outlet of the vaporizer communicates with the gas-liquid separator.

13. The gas-liquid separating device of claim 11, further comprising:
a second intermediate plate disposed between the gas-liquid separator and the super heater to separate the super heater from the gas-liquid separator, the second intermediate plate including a fluid connection path so that an inlet of the super heater for the vaporized fluid A communicates with the gas-liquid separator.

14. The gas-liquid separating device of claim 11, wherein the gas-liquid separator has a sufficient width to separate the vaporizer and the super heater by a predetermined distance in a third direction perpendicular to both the first and second directions.

15. The gas-liquid separating device of claim 11, wherein the baffle is disposed adjacent to the gas outlet of the gas-liquid separator.

16. The gas-liquid separating device of claim 11, wherein the vaporizer is detachably attached to one side of the gas-liquid separator, and wherein the super heater is detachably attached to the other side of the gas-liquid separator.

17. The gas-liquid separating device of claim 11, wherein the A-fluid channel of each A-channel plate includes a series of bends in alternating directions, the bends forming a continuous path following a zigzag pattern.

18. The gas-liquid separating device of claim 17, wherein the channel has a horizontally symmetrical structure in which sides of consecutive bends contact each other.

* * * * *